(12) United States Patent
Hooper

(10) Patent No.: US 7,093,278 B1
(45) Date of Patent: Aug. 15, 2006

(54) REMOTE CONSOLE FOR MONITOR AND CONTROL OF SYSTEM FIRMWARE

(75) Inventor: Christopher D. Hooper, Fremont, CA (US)

(73) Assignee: 3PARdata, Inc., Fremont, CA (US)

( * ) Notice: Subject to any disclaimer, the term of this patent is extended or adjusted under 35 U.S.C. 154(b) by 772 days.

(21) Appl. No.: 10/142,398

(22) Filed: May 8, 2002

(51) Int. Cl.
*G06F 17/30* (2006.01)
(52) U.S. Cl. .............................. 726/2; 726/22; 726/27
(58) Field of Classification Search ........ 713/168–170; 726/2–4, 6, 22, 27; 709/200, 223–225
See application file for complete search history.

(56) References Cited

U.S. PATENT DOCUMENTS

| 4,896,319 | A | * | 1/1990 | Lidinsky et al. ............ 370/427 |
| 5,222,140 | A | * | 6/1993 | Beller et al. .................. 380/30 |
| 6,021,495 | A | * | 2/2000 | Jain et al. ..................... 726/16 |

* cited by examiner

*Primary Examiner*—Hosuk Song
(74) *Attorney, Agent, or Firm*—Patent Law Group LLP

(57) ABSTRACT

A system and method are provided for permitting a console to be connected to an external port of a first node for monitoring and controlling the first node in a default mode. The first node may also operate in a terminal mode in which an internal port of the first node is connected to an internal port of a second node to permit the console and the second node to communicate via the first node.

10 Claims, 5 Drawing Sheets

REMOTE CONSOLE FOR MONITOR AND CONTROL OF SYSTEM FIRMWARE

CROSS-REFERENCE TO RELATED APPLICATION

This patent application relates to commonly-assigned U.S. patent application Ser. No. 09/633,088 entitled "Data Storage System," filed Aug. 4, 2000, the disclosure of which is hereby incorporated by reference in its entirety.

TECHNICAL FIELD

The present invention relates generally to remote monitoring and control of system firmware, and in particular to a remote console for simultaneous monitor and control of system firmware.

BACKGROUND

In the context of computer systems, enterprise storage architectures provide mass electronic storage of large amounts of data. The rapid pace of technological advances in computing and networking infrastructure has driven a significant transformation of enterprise storage architectures. This has resulted in a variety of different storage architectures, such as, for example, direct attached JBODs (Just a Bunch Of Disks), SAN (Storage Area Network) attached JBODs, host adapter RAID (Redundant Array of Inexpensive/Independent Disks) controllers, external RAID controllers, redundant external RAID controllers, and NAS (Network Attached Storage). Each of these storage architectures may serve a particular need, and thus may differ significantly in terms of functionality, performance, cost, availability, scalability and manageability.

One exemplary computer system employs a "node" to control the access of data into a number of disk drives. The node stores redundant data (e.g., parity information or a duplicate copy of the data itself) to multiple disk drives so that if one disk drive fails, the redundant data can be used to reconstruct the data. The node includes a main computer system having system memory into which data can be cached to reduce the slow seek time associated with disk drives. In addition, multiple nodes may be used within a system to increase performance and provide redundancy. In some embodiments, multiple nodes are provided to avoid the failure of a single node resulting in the failure of the entire system.

Each node may include an external serial port for permitting a console to be connected thereto for monitoring firmware output. Thus, a user at such a console may monitor firmware output and may also enter commands to the firmware via the console and the external serial port.

In embodiments employing multiple nodes, it may be desirable to remotely monitor and control each of the nodes. One way to monitor and control each of the nodes is to connect a console to each of the nodes at an external serial port thereof. Thus, in this configuration, each node has an associated console from which a user may monitor and control the node. This approach, however, requires the expense of providing and maintaining multiple consoles for the set of nodes.

Another conventional approach to monitoring and controlling multiple nodes employs a physical switch attached to the serial console port of each of the nodes and to a console. Pursuant to this approach, by changing the position of the switch, the switch may connect the console to different nodes. This approach also requires additional hardware (i.e., the physical switch) to be disposed between the console and the various nodes. Further, this approach requires the switch position to be changed, either manually or otherwise.

Yet another approach employs a device capable of multiplexing simultaneous virtual connections to a single physical connection. An example of such a device is a terminal server, which may be connected between the console and the various nodes. Use of such a device requires the expense of providing and maintaining the terminal server as well as the various nodes and the console.

SUMMARY

Accordingly, a need exists to provide a system and method that reduce or eliminate the need for additional hardware and additional cabling by allowing a single console to remotely monitor and control multiple nodes.

In general, according to some embodiments, a system and method are provided for permitting a console to be connected to an external port of a first cluster node for monitoring and controlling the first cluster node in a default mode. The first cluster node may also operate in a terminal mode in which an internal port of the first cluster node is connected to an internal port of a second cluster node to permit the console and the second cluster node to communicate via the first cluster node.

In one embodiment, a method is provided for remote control and monitoring of multiple data processing devices, or nodes. A primary data processing device is provided that has a set of internal ports for connecting to an associated set of secondary data processing devices and an external port for connecting to a console. The primary data processing device then receives a specify command from the console over the external port, which specifies at least one of the internal ports. After receipt of the specify command, the primary data processing device sends data received from the console at the external port over the specified port to the secondary device associated with the specified port. The primary data processing device also then sends data received at the specified port from the secondary device associated with the specified port to the console over the external port.

In addition, upon receipt of the specify command, the primary data processing device may send a password, or key sequence, over the specified port to one of the secondary devices. The secondary device, upon receiving the password or key sequence, validates the internal port over which the secondary device received the password or key sequence. The secondary device then sends monitoring data over the validated internal port to the primary data processing device, which then sends the monitoring data received from the secondary device over the external port of the primary device to the console. The secondary device also receives commands originating from the console over the specified internal port and processes the same.

Additional details regarding the present system and method may be understood by reference to the following detailed description when read in conjunction with the accompanying drawings.

BRIEF DESCRIPTION OF THE DRAWINGS

Common reference numerals are used throughout the drawings and detailed descriptions to indicate like elements.

DETAILED DESCRIPTION

Figure 1:
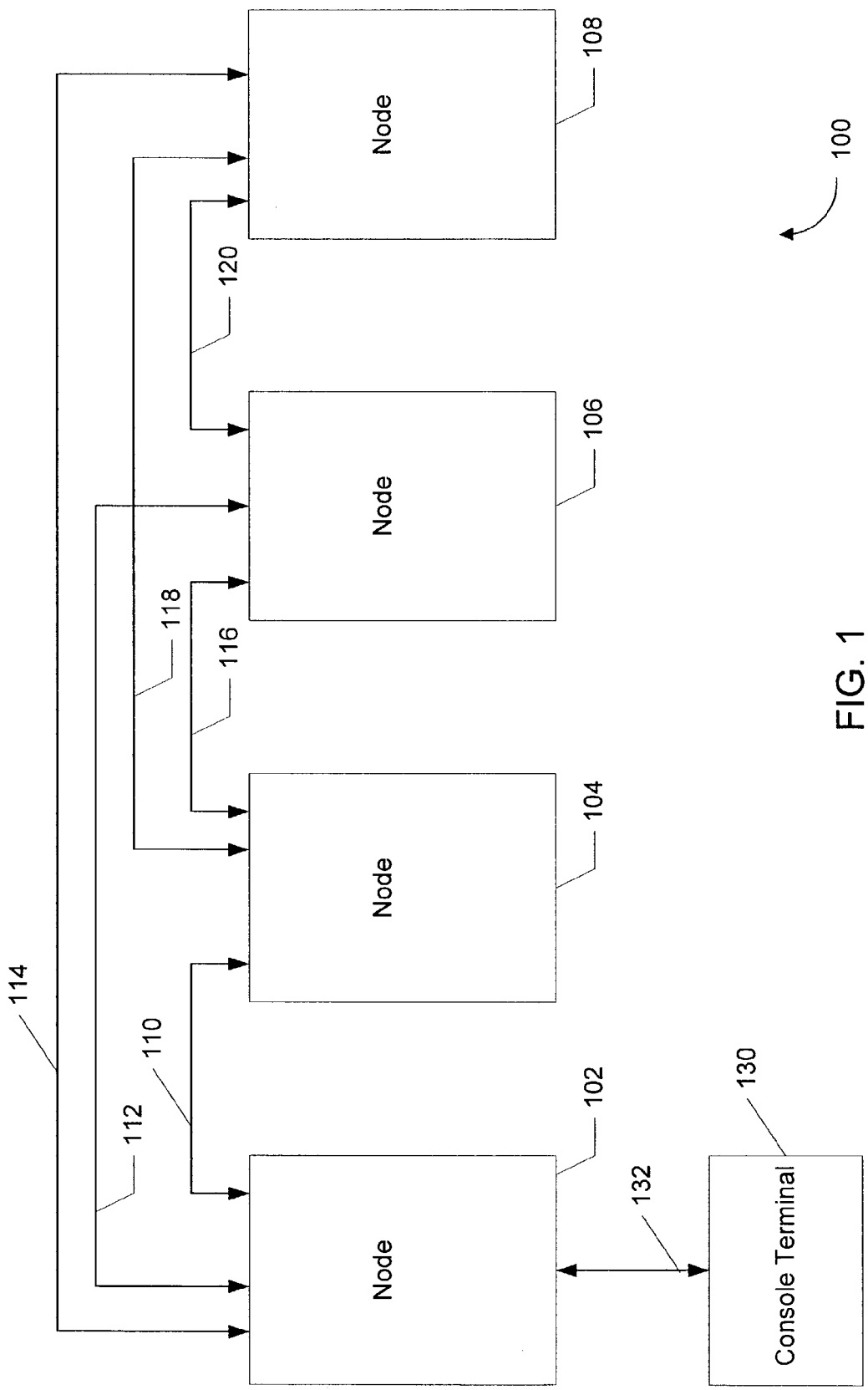
FIG. 1 illustrates a cluster of nodes in accordance with one embodiment of the present invention.

FIG. 1 illustrates a cluster 100 of nodes 102, 104, 106, and 108. As shown, the cluster 100 includes four nodes 102–108, although the number of nodes may vary. In an alternative embodiment, the cluster 100 includes eight nodes. Each of the nodes 102–108 may comprise a data processing device, details of which are described in more detail below with reference to FIG. 2.

As shown in FIG. 1, the node 102 is connected to links 110, 112, and 114. The link 110 connects an internal serial port of the device 102 with an internal serial port of the device 104. The link 112 connects an internal serial port of the device 102 with an internal serial port of the device 106. The link 114 connects an internal serial port of the device 102 with an internal serial port of the device 108.

The node 104 is also connected to links 116 and 118. The link 116 connects an internal serial port of the device 104 with an internal serial port of the device 106. The link 118 connects an internal serial port of the device 104 with an internal serial port of the device 108.

The node 106 is also connected to link 120. The link 120 connects an internal serial port of the device 106 with an internal serial port of the device 108.

The links 110–120 may be at least partially formed on a center panel (not shown), which may include wires or other data conduits comprising the links 110–120. The center panel may also include high speed communication lines for permitting high speed data transfers between the nodes 102–108.

In one embodiment, the links 110–120 comprise serial links for permitting serial communications between the nodes 102–108. The serial communications may comprise communications compliant with the EIA/TIA-232-E specification, entitled "Interface Between Data Terminal Equipment and Data Circuit-Termination Equipment Employing Serial Binary Data Interchange." This specification, or standard, is also commonly referred to as RS-232. Alternatively, the links 110–120 may permit communications pursuant to other suitable standards.

A console 130 connects to an external terminal of the node 102 via line 132. The console 130 typically includes a monitor or display device (not shown) and an input device (not shown), such as a keyboard and mouse. In this configuration, when the node 102 is operating in default mode, the control terminal 130 monitors and controls the node 102 by directly communicating with the node 102 over the line 132. Monitoring data received over the line 132 is displayed at the console 130 and the console 130 sends commands over the line 132 that are entered at the console 130.

When the node 102 is operating in terminal mode, however, the node 102 allows communication from the console 130 through the node 102 to a specified one of the nodes 104–108. Thus, when the node 102 operates in terminal mode, the node 102 forwards commands or other data received by the node 102 from the console 130 over the line 132 to a specified one of the nodes 104–108 over a corresponding one of the links 110–114. Also, when operating in terminal mode, the node 102 forwards data received by the node 102 from the specified one of the nodes 104–108 over a corresponding one of the links 110–114 to the console 130 over the line 132.

Figure 2:
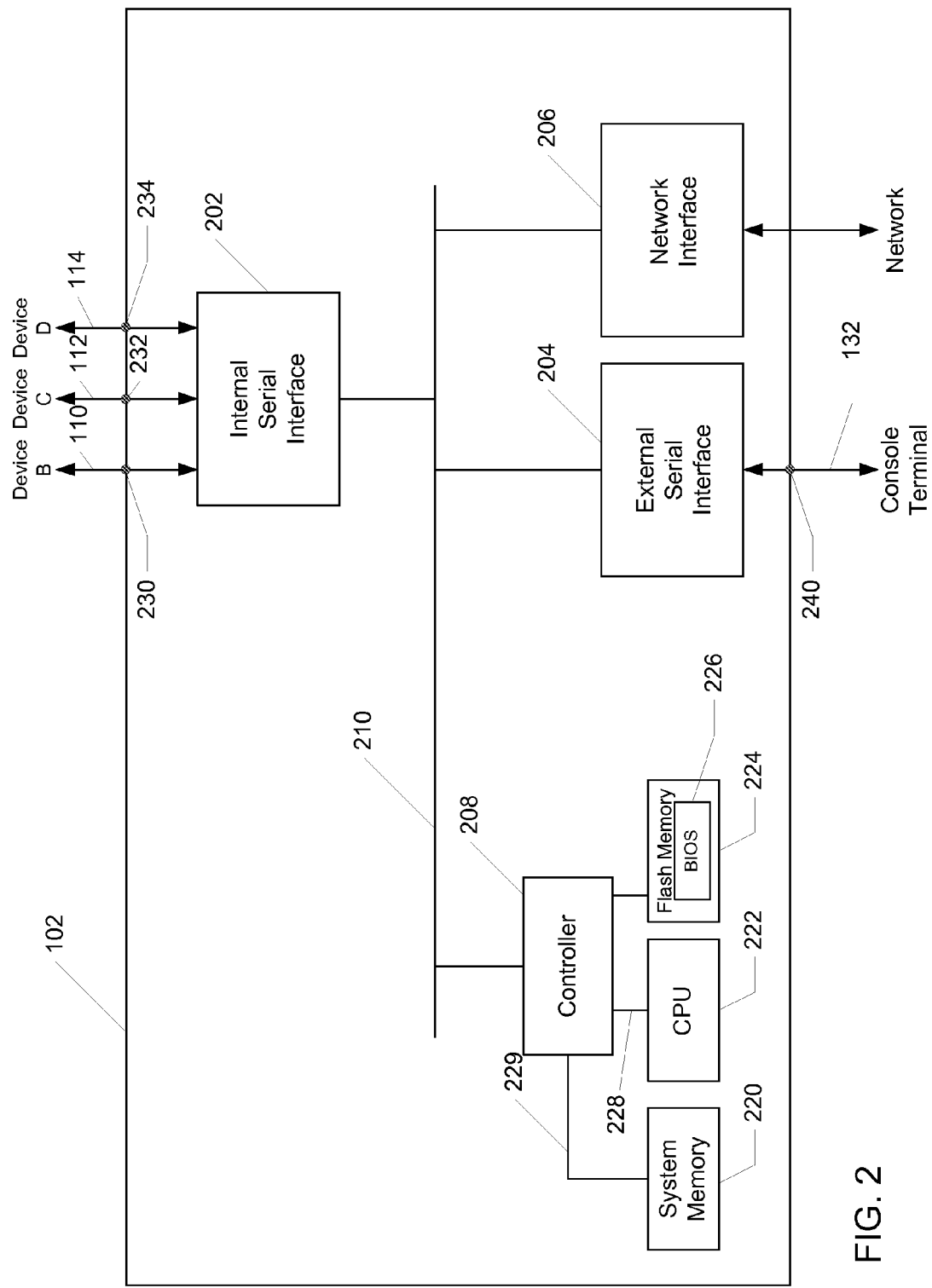
FIG. 2 illustrates details of one of the FIG. 1 nodes in accordance with one embodiment of the present invention.

FIG. 2 illustrates details of the node 102. The other nodes 104–108 may be configured identical to the node 102.

As shown, the node 102 includes an internal serial interface 202, an external serial interface 204, a network interface 206, and a controller 208 all coupled by at least one bus 210. A system memory 220, at least one central processing unit (CPU) 222, and non-volatile memory, such as flash memory 224, are connected to the controller 208. BIOS (Basic Input Output System) firmware 226 is stored in the flash memory 224.

The internal serial interface 202 and the external serial interface 204 may each comprise a conventional serial interface chip, such as a Super I/O chip or a UART (Universal Asynchronous Receiver/Transmitter). A UART is generally an integrated circuit, which contains all the software programming necessary to fully control the serial port of a data processing device, such as the node 102. The UART chip generally transmits and receives data through one or more associated serial ports and converts bytes into serial bits for transmission, and vice versa. Optionally, the internal serial interface 202 and the internal serial interface 204 may comprise a single chip.

As shown in FIG. 2, the node 102 includes internal serial ports 230, 232, 234, which are respectively connected to links 110, 112, 114. The serial ports 230, 232, 234 also connect to the internal serial interface 202.

The node 102 also includes external serial port 240, which permits connection of the external serial interface 204 to the line 132 for enabling serial communication between the console 130 (FIG. 1) and the external serial interface 204.

The network interface 206 may be provided to permit communication between the node 102 and a network (not shown). The network interface 206 may comprise an Ethernet interface or other suitable network interface.

The controller 208 interfaces with the system memory 220, the CPU 222, and the flash memory 224. In one embodiment, the CPU 222 comprises a pair of CPUs.

The CPU 222 generally provides processing capability for the control of data transfers through the node 102. Each CPU 222 can be implemented with any suitable processing device, such as, for example, a PENTIUM III by Intel Corporation. The controller 208 is connected to CPU 222 via a CPU bus 228 and may comprise an ASIC that generally coordinates and manages the overall operation of node 102. The controller 208 may function as a bridge between the CPU bus 228 and a bus 229 for the system memory 220.

BIOS 226 is stored in the flash memory 224. The BIOS 226 comprises firmware for providing instructions for the tasks that the node 102 performs at start-up. These tasks, may include, for example, Power-On Self Test (POST), and booting an operating system. Furthermore, the BIOS 226 provides an interface to the underlying hardware for the operating system in the form of a library of interrupt handlers.

Additional details regarding the node 102 and the cluster 100 are described in U.S. patent application Ser. No. 09/633,088 entitled "Data Storage System," filed Aug. 4, 2000, the disclosure of which is incorporated herein by reference. Additional details regarding the function and operation of the BIOS 226 are described below.

Figure 3:
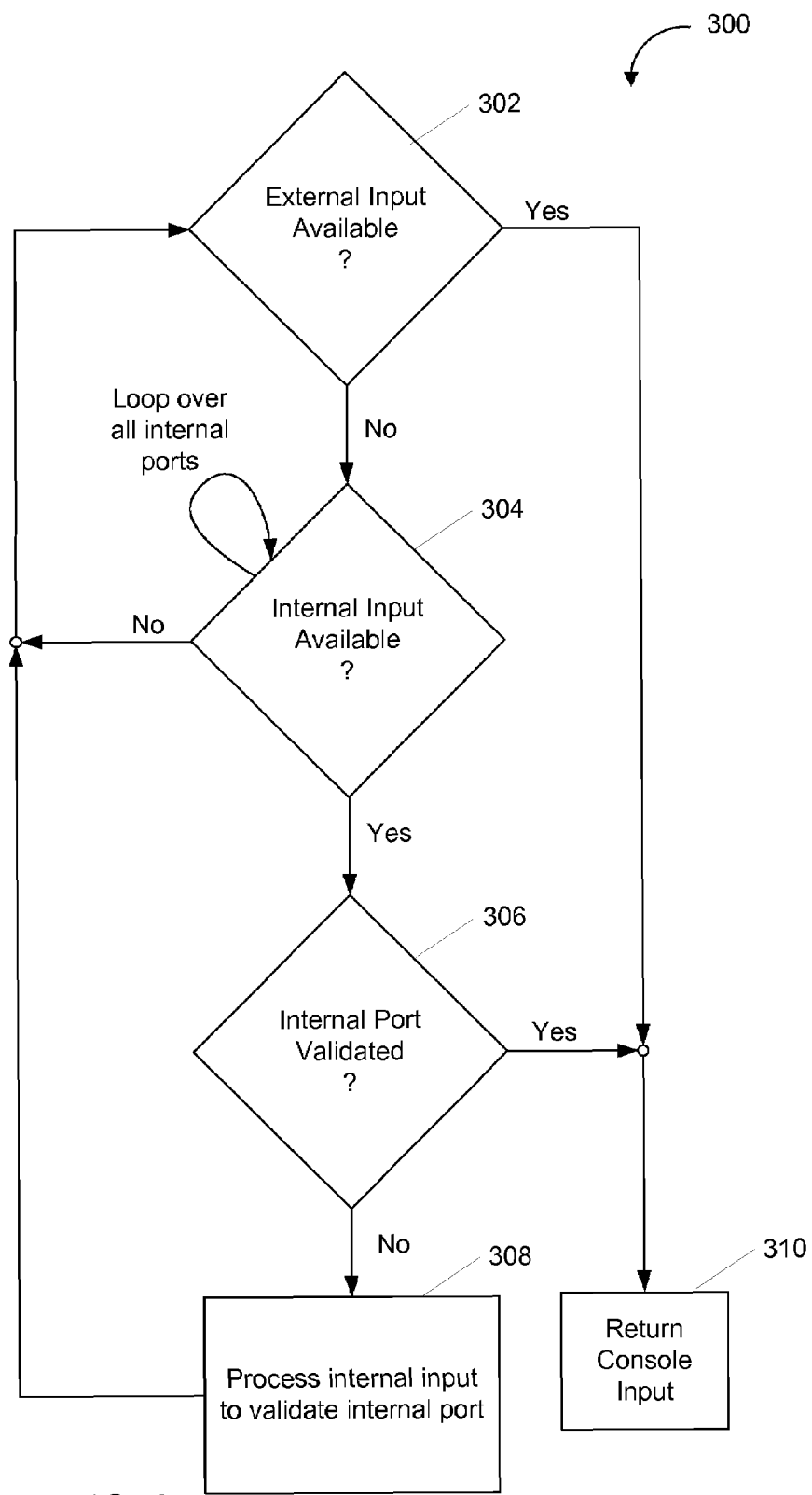
FIG. 3 is a flowchart illustrating a method for retrieving console data in accordance with one embodiment of the present invention.

FIG. 3 is a flowchart 300 illustrating operation of an embodiment of one of the algorithms of the BIOS 226 (FIG. 2) of one of the nodes 102–108. The flowchart 300 generally shows an example method of determining whether input is available and for retrieving same. Initially, at block 302, the BIOS 226 determines whether external input is available over the external port 240 (FIG. 2). If external input, such as from the console 130 over line 132, is available over the external port 240, execution proceeds to block 310 and the algorithm returns the input to the controller 208 of the associated node.

If external input is not available over the external port 240, execution proceeds to block 304. At block 304, the BIOS 226 determines whether internal input is available over one or more of the internal ports 230, 232, 234, by checking each of the individual internal ports 230, 232, 234 for internal input. If at block 304, the BIOS 226 determines that internal input is available at one of the internal ports 230, 232, 234, execution proceeds to block 306. If at block 304, the BIOS 226 determines that internal input is not available at any of the internal ports 230, 232, 234, then execution returns to block 302 and the algorithm determines again whether external input is available.

At block 306, the BIOS 226 determines whether the internal port at which internal input is available has been previously validated. Validation of an internal port is described below. If at block 306, the BIOS 226 determines that the internal port at which internal input is available has been previously validated, execution proceeds to block 310 and the algorithm returns the input to the controller 208 of the associated node. If, however, at block 306, the BIOS 226 determines that the internal port at which internal input is available has not been previously validated, execution proceeds to block 308.

At block 308, the BIOS 226 processes the internal input to validate the internal port at which the internal input is available. In one embodiment, the BIOS 226 validates the internal port at which the terminal input is available by comparing the internal input with a predetermined password, or key sequence. The BIOS 226 then validates the internal port at which the internal input is available only if the internal input matches the predetermined password. After the BIOS 226 has processed the internal input, pursuant to block 308, execution returns to block 302.

Figure 4:
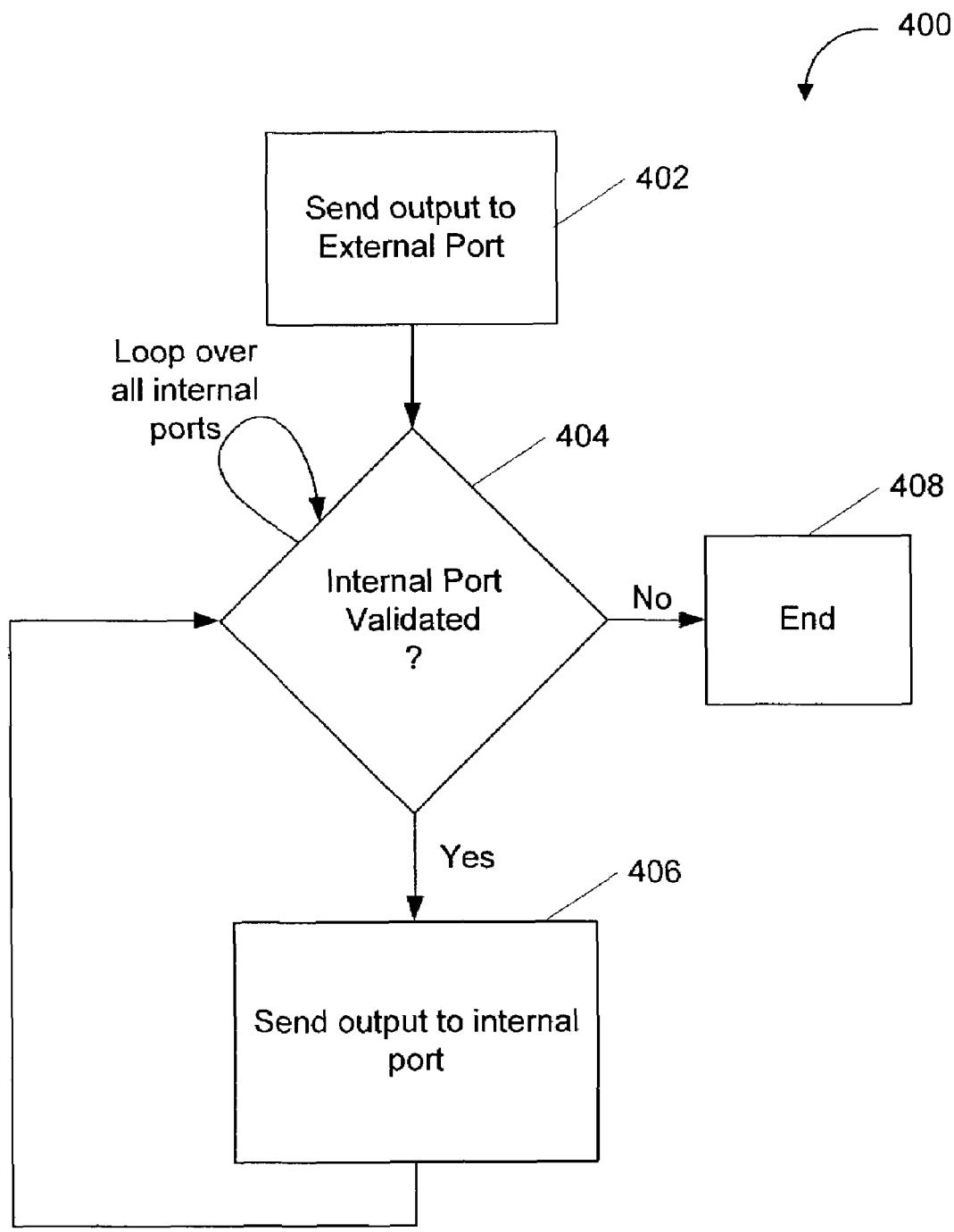
FIG. 4 is a flowchart illustrating a method for sending console data in accordance with one embodiment of the present invention.

FIG. 4 is a flowchart 400 that illustrates a method of sending console data, according to one embodiment of the present invention. At block 402, the BIOS 226 sends the console output over external port 240, regardless of whether a line 132 or console 130 (FIG. 1) is connected thereto. Execution then proceeds to block 404 at which the BIOS 226 determines whether one or more of the internal ports 230–234 have been previously validated. If, pursuant to block 404, the BIOS 226 determines that any of the internal ports 230–234 has been previously validated, execution proceeds to block 406, else execution proceeds to block 408.

At block 406, the BIOS 226 causes the console output to be sent over the previously validated port or ports as determined at block 404. At block 408, the method ends.

Figure 5:
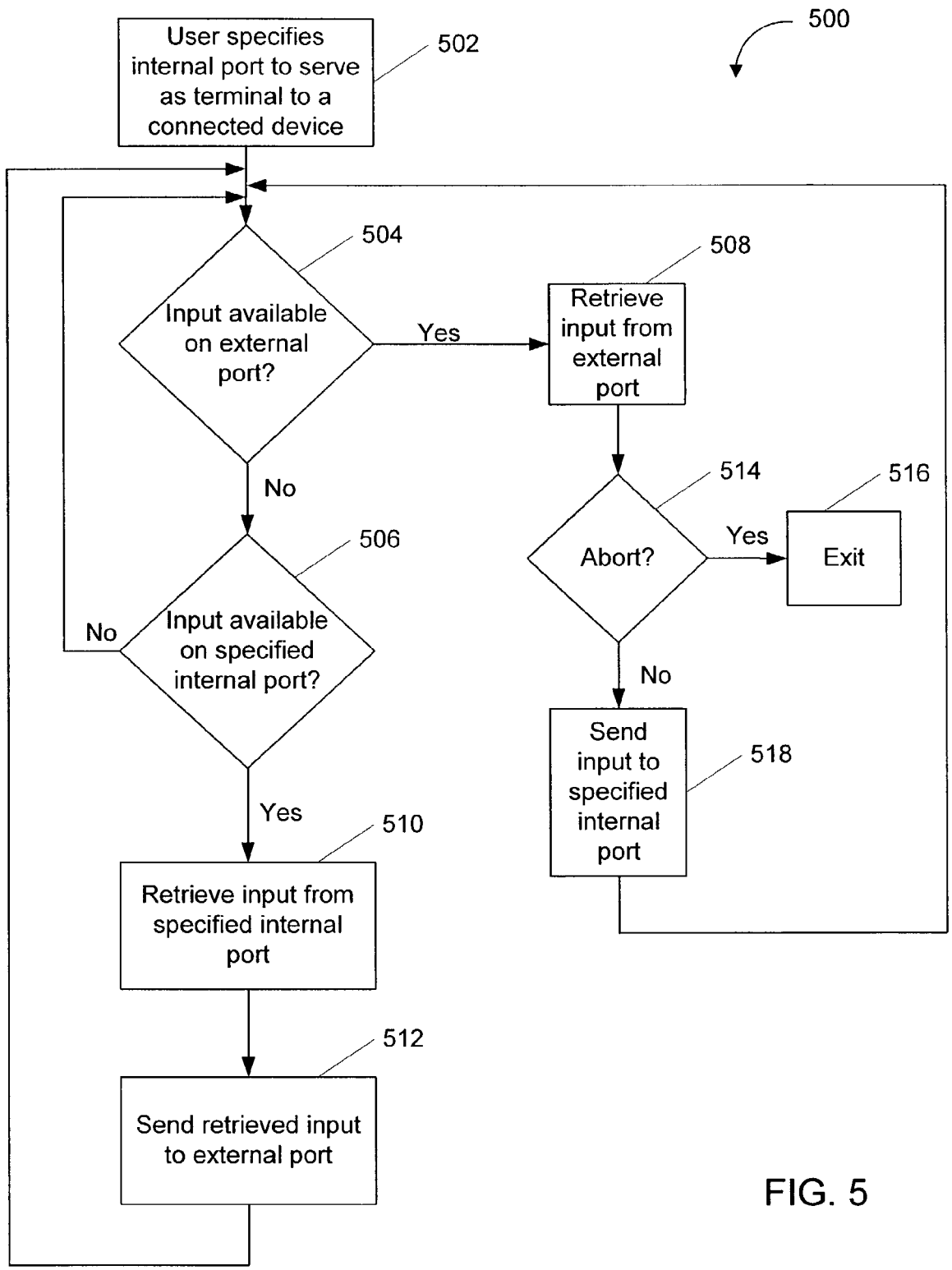
FIG. 5 is a flowchart illustrating one embodiment of a method of operation of a FIG. 1 node in accordance with one embodiment of the present invention.

FIG. 5 illustrates a flowchart 500 that shows operation of the node 102 to which a console 130 is connected via a line 132 (FIG. 1). The node 102 initially operates in default mode where the node 102 receives commands from the console 130, processes the commands and sends data to the console 130 over the line 132.

At block 502, a user specifies an internal port to serve as a terminal for connection to one of the other nodes 104, 106, 108. The user may specify the internal port by sending a specify command from the console 130 over the line 132 to the node 102 that identifies the internal port 230, 232, 234. In response to receiving the specify command from the console 130, the node 102 sends a password, or a key sequence, over the specified, or identified, internal port. As described above with reference to FIG. 3, the node coupled to the specified port validates a corresponding internal port. After the node 102 has sent the password, or key sequence, over the specified, or identified, internal port, the node 102 enters "terminal" mode and ceases operation of the default mode. The password, or key sequence, is then used by the receiving node to validate the port at which the password, or key sequence, was received.

At block 504, the BIOS 226 determines whether input is available on the external port 240. If the BIOS 226 determines that input is not available on the external port 240, execution proceeds to block 506, else execution proceeds to block 508. Typically, the input available on the external port 240 will comprise input from the console 130 (FIG. 1).

At block 506, the BIOS 226 determines whether input is available on the specified internal port. If, pursuant to block 506, the BIOS 226 determines that input is available on the specified internal port, execution proceeds to block 510, else execution returns to block 504.

At block 510, the BIOS 226 retrieves input from the specified internal port and execution proceeds to block 512. At block 512, the BIOS 226 sends the retrieved input over the external port 240 for receipt by the console 130 (FIG. 1) and then execution returns to block 504.

At block 508, the BIOS 226 retrieves input from the external port 240 and execution proceeds to block 514. At block 514, the BIOS 226 determines whether the retrieved input from the external port 240 comprises an abort command for aborting "terminal" mode for return to default mode.

If the BIOS 226 at block 514 determines that the retrieved input from the external port 240 comprises an abort command, execution proceeds to block 516 and the BIOS 226 exits, or terminates, operation in terminal mode. If the BIOS 226 at block 514 determines that the retrieved input from the external port 240 does not comprise an abort command, execution proceeds to block 518. At block 518, the BIOS 226 sends the retrieved input from the external port 240 to the specified internal port 230, 232, 234, and execution then returns to block 504.

With reference to FIG. 1, in operation, the node 102 operates in default mode and communicates with the console 130 over the line 132. The node 102 also communicates with the nodes 104, 106, and 108 over lines 110, 112, and 114, respectively. In default mode, a user may send control commands to the node 102 by entering such commands at the console 130, which sends the commands to the node 102 via the line 132. The node 102, in turn, receives these control commands via the external port 240. The node 102 also sends monitoring data to the console terminal 130 over the external port 240 and line 132 to permit a user to monitor operation of the node 102 in default mode.

A user may also cause the node 102 to enter terminal mode to permit the user to monitor and/or control one or more of the nodes 104, 106, 108 at the console 130 via the line 132 and the node 102. The node 102 enters terminal mode upon receiving a specify command from the console 130. The specify command specifies, or identifies, at least one of the internal ports 230, 232, 234.

In addition, upon receiving the specify command, the node 102 transmits a password, or key sequence, over the specified internal port and the associated link. The node coupled to the associated link receives the password over an associated internal port and then validates the associated internal port. After the associated internal port is validated, the node coupled to the associated link sends console data over the validated internal port, over the associated link, to the specified port of the node 102. The node 102, operating in terminal mode, then receives the console data from the specified port and sends the received console data over the external port 240 to the console 130.

Similarly, the node 102, operating in terminal mode, receives commands from the console 130 over the external port 240 and, rather than processing and acting on the received commands, sends the received commands over the specified internal port to the node connected to the specified internal port.

In this manner, the console 130 may control and/or monitor the node 102 to which the console 130 is directly connected when the node 102 operates in default mode. The console 130 may also control and/or monitor the nodes 104, 106, 108 to which the console 130 is not directly connected by operating the node 102 in terminal mode.

The above-described embodiments of the present invention are meant to be merely illustrative and not limiting. Thus, those skilled in the art will appreciate that various changes and modifications may be made without departing from this invention in its broader aspects. Therefore, the appended claims encompass such changes and modifications as fall within the scope of this invention.

What is claimed is:

1. A method for providing remote control and monitoring of multiple data processing devices, the method comprising:
    providing a primary data processing device having a first set of ports for connecting to an associated set of secondary data processing devices and a second port for connecting to a console;
    specifying one of the first set of ports;
    sending data received from the console at the second port over the specified port to the secondary device associated with the specified port;
    sending data received at the specified port from the secondary device associated with the specified port to the console over the second port;
    receiving an abort command at the second port;
    ceasing to send data received from the console at the second port over the specified port to the secondary device associated with the specified port in response to receiving the abort command.

2. The method of claim 1, wherein the first set of ports comprises serial ports.

3. The method of claim 1, wherein the second port comprises a serial port.

4. The method of claim 1, further comprising sending a password or key sequence over only the specified port in response to receiving the specify command.

5. A method for providing remote control and monitoring of multiple data processing devices, the method comprising:
    providing a primary data processing device having a first set of ports for connecting to an associated set of secondary data processing devices and a second port for connecting to a console;
    sending monitoring data originating at the primary data processing device over the second port;
    receiving a specify command over the second port, the specify command identifying at least one of the first set of ports;
    ceasing to send monitoring data originating at the primary data processing device over the second port in response to receiving the specify command;
    sending data received from the console at the second port over the specified port to the secondary device associated with the specified port;
    sending data received at the specified port from the secondary device associated with the specified port to the console over the second port.

6. The method of claim 5, further comprising sending a password or key sequence over only the specified port in response to receiving the specify command.

7. The method of claim 5, wherein the first set of ports and the second port comprise serial ports.

8. The method of claim 5, further comprising:
    receiving an abort command at the second port;
    ceasing to send data received from the console at the second port over the specified port to the secondary device associated with the specified port in response to receiving the abort command.

9. A system, comprising:
    a primary data processing device having a set of internal ports for connecting to an associated set of secondary data processing devices and an external port for connecting to a console;
    the secondary data processing devices each comprising a set of internal ports for connecting to the internal ports of the primary data processing device;
    the primary data processing device configured to operate in a default mode by sending monitoring data originating at the primary data processing device to the console over the external port of the primary data processing device;
    the primary data processing device configured to operate in a terminal mode in response to receiving a specify signal that identifies one of the internal ports of the primary data processing device, the primary data processing device receiving monitoring data from one of the secondary data processing devices over the identified internal port and sending the monitoring data over the external port of the primary data processing device.

10. The system of claim 9, wherein the primary data processing device operating in terminal mode receives command signals at the external port of the primary data processing device and sends the received command signals over the identified internal port of the primary data processing device.

* * * * *